(No Model.) 2 Sheets—Sheet 2.

M. A. GRAHAM.
GAS ENGINE.

No. 445,110. Patented Jan. 20, 1891.

Witnesses:
J. R. Lourie
H. C. Lee.

Inventor,
Marcellus A. Graham
By Dewey & Co.
Attys

UNITED STATES PATENT OFFICE.

MARCELLUS A. GRAHAM, OF SAN FRANCISCO, CALIFORNIA.

GAS-ENGINE.

SPECIFICATION forming part of Letters Patent No. 445,110, dated January 20, 1891.

Application filed August 20, 1890. Serial No. 362,545. (No model.)

*To all whom it may concern:*

Be it known that I, MARCELLUS A. GRAHAM, a citizen of the United States, residing in the city and county of San Francisco, State of California, have invented an Improvement in Gas-Engines; and I hereby declare the following to be a full, clear, and exact description of the same.

My invention relates to certain improvements in what are known as "gas" or "explosive" engines.

It consists in certain details of construction which will be more fully explained by reference to the accompanying drawings and specification, in which—

Figure 1:
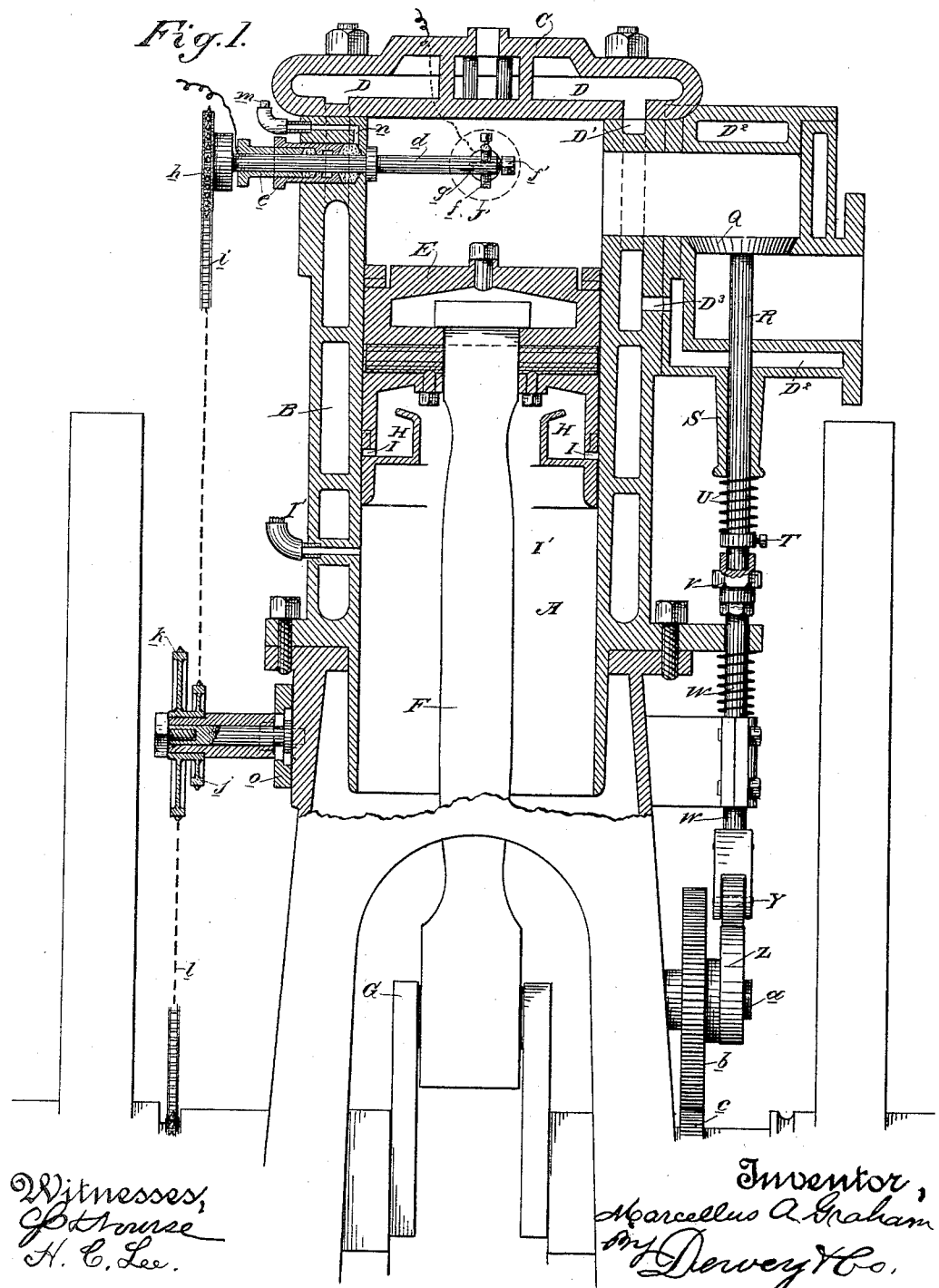
Figure 2:
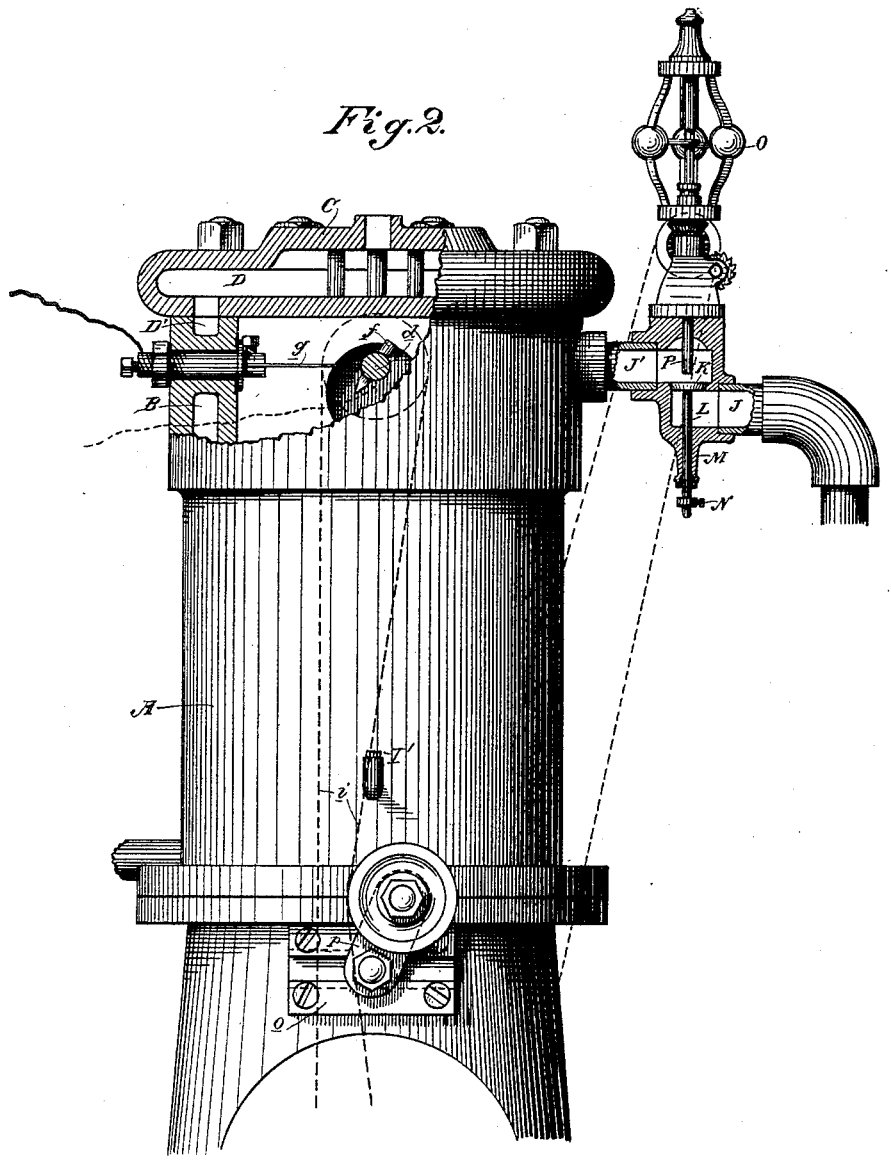

Figure 1 is a vertical section taken through the cylinder, cylinder-head, and piston, showing exhaust-valve ignitor and other parts. Fig. 2 is a view and partial section taken at right angles with Fig. 1, showing a single chain to drive the ignitor.

In the construction of my engine I make the cylinder A with double sides or walls forming water-spaces B, through which water is circulated by means of suitably-arranged pipes to prevent the cylinder from becoming unduly heated by the constant explosion of gas therein.

C is the cylinder-head, which is fitted to the upper end and secured thereto with bolts and nuts. This cylinder-head is chambered out, as shown at D, having suitable connecting studs or diaphragms to give it the necessary strength, and openings are made in the upper end of the water-chambers which surround the cylinder and corresponding openings in the cylinder-head, as shown at D', so that the openings in the head and those around the cylinder communicate with each other, and, water being admitted into the space either through the cylinder-head by means of an opening therein and connecting-pipes or through any convenient portion of the side of the cylinder with corresponding discharge-pipes, a circulation may be maintained constantly throughout the head and side chambers, which will prevent the cylinder from being heated unduly by the constant explosions of gas necessary to its operation.

As the exhaust-passage is subjected to a high heat from the escaping gases, I surround it with a water-jacket, as shown at $D^2$, and this jacket is connected with the one around the cylinder by a passage $D^3$, which allows a constant circulation of water.

The piston E is of any suitable or usual form adapted to reciprocate within the cylinder and of sufficient length to act as its own guide. The connecting-rod F is coupled directly with this piston, and the engine being shown in the present case as of the vertical pattern the lower end of the connecting-rod is coupled with the crank G upon the crank-shaft, and through this power is communicated from the reciprocating piston to the rotary shaft.

In order to constantly lubricate the sides of the cylinder and supply a fresh amount of lubricant to take the place of that which is necessarily dried up and dissipated by the heat of the cylinder, I have shown an oil chamber or reservoir H formed within the piston and having the small openings or passages I, through which the oil is allowed to pass, so as to have a contact with the inside of the cylinder; but the piston moves sufficiently tight within the cylinder to prevent the oil leaking out and running down in too great a quantity. When the piston is reciprocated, however, the oil being in contact with it through all of these numerous orifices, a thin film of the oil will be spread over the inner surface of the cylinder with each reciprocation of the piston, and this will be sufficient to properly lubricate the moving parts without any waste or leakage. This chamber is preferably filled with waste or other porous absorbent, which will retain the lubricant and will deliver it gradually through the openings. Exterior oil-cups I' may also be fixed to the sides of the cylinder.

To operate this engine I employ an explosive gas or a vapor which is produced by mixing the proper proportion of atmospheric air with the vapor of naphtha, benzine, or any suitable volatile hydrocarbon, and this vapor is drawn into the cylinder by a downstroke of the piston, which acts as a pump, drawing the vapor from the source of supply through a suitable valve into the cylinder, and when the piston returns upon its upstroke the valve is closed and the vapor compressed in the upper part of the cylinder, so that when the piston commences its downstroke again the upper part of the cylinder is charged with compressed explosive gas, and this is then ignited by an electrical sparker or ignitor operating within the cylinder, and the explosion gives the piston such an impulse that it will complete the present stroke and the following one, in which it again acts as a pump to fill the cylinder with a new charge for a second explosion. The engine thus acts at one stroke as a pump to supply the cylinder with the explosive material, and the explosion taking place at the next stroke gives it sufficient impulse to continue its motion. This irregular power is properly stored and distributed by means of two heavy fly-wheels G', mounted upon the main shaft, and this gives steadiness to the movements of the engine, notwithstanding the irregularity with which the power is applied. In order to admit the explosive gas or vapor, I have shown an inlet-passage J, through which it passes into a chamber beneath the valve K. This valve has a stem L extending down through the proper guide M, with a collar N fixed to it, by which the lift of the valve may be regulated. The valve is, as shown, of the pattern known as a "puppet-valve," and when the piston E within the cylinder moves down it produces a vacuum in the passage J and J', and this raises the valve K and allows the explosive vapor to flow into the cylinder and fill it. Upon the return of the piston, so as to compress the vapor in the upper part of the cylinder, this valve will naturally be closed by the pressure and will make the cylinder perfectly tight at the time of the explosion, so that the whole force of the explosion will be applied to move the piston.

In order to regulate the amount of vapor which is admitted to the engine, I have shown a governor O, of any usual or suitable pattern, mounted directly upon the chamber above the valve K, and the stem P of this governor extends down through the top of the valve-chamber and just above the center of the valve K. When the engine is at rest, the stem P of the governor will be withdrawn, so as to allow the valve K to open to its fullest extent; but when the engine is in motion the end of the stem P approaches the top of the valve K and limits the amount of its opening directly in proportion to the speed of the engine.

When the speed of the engine becomes as great as is to be desired, the lower end of the stem P will be brought into contact with the top of the valve K by the action of the governor and will thus prevent the valve being opened so as to admit the explosive vapor to the cylinder, or, if opened at all, to a very small degree, and when the speed of the engine is again decreased, the operation of the governor will be to allow the valve to open again.

The novel feature of this invention is the direct application of the governor stem or spindle to the main valve, admitting the vapor to the engine without the use of a supplemental or intermediate valve of any kind, and by this means I avoid considerable spaces and passages within which the vapor would remain between the source of supply and the engine. It will be manifest that this direct connection of the governor stem or spindle with the main valve might be accomplished from the lower end of the valve-stem L in a manner which would cause it to operate; but I have found the above arrangement to be a very convenient and effective one.

Q is the exhaust-valve, which is also a puppet-valve similar to the inlet-valve K. Its stem R extends downward through the guide S and has a collar T fixed to its lower end, and a spiral spring U, surrounding the stem, acting between the collar and the guide-sleeve S, serves to keep the valve closed upon its seat. The lower end of the stem R enters a socket in the adjusting-screw V, which is fixed upon the upper end of the reciprocating rod W. This rod stands in line with the valve-stem R and has journaled at its lower end an anti-friction wheel Y, which travels in contact with the cam Z. This cam is fixed upon a shaft $a$ and is driven from gearing $b$ and a pinion $c$ on the engine-shaft. The proportions of this gearing are such that the exhaust-valve is only opened at every alternate stroke for the escape of the products of the explosion and remains closed when a charge of the gas is brought into the engine-cylinder and compressed and exploded therein. The exhaust-passage is large and direct and when the valve is opened it allows a free discharge from the cylinder. The passage is jacketed to keep it cool, as before described. By reason of the stem R and the adjustable nut V, fitted upon the upper end of the shaft W, an accurate adjustment may be made, so as to bring the roller Y into proper contact with the cam Z and at the same time to allow the valve Q to close properly upon its seat.

The explosive vapor within the cylinder may be ignited at the proper time by any suitable and well-known means. In the present case I have shown a shaft $d$, extending through a double stuffing-box $e$ horizontally into the upper end of the cylinder. Through the end of the shaft which is within the cylinder I fix a radial arm $f$, which projects at right angles from the shaft and rotates therewith, and which is adjustable, being held by a set-screw $f'$. Through the side of the cylinder, at right angles with the shaft $d$ and in line with the arm $f$, projects a spring-arm $g$, the end of this arm being in such position that the constant rotation of the shaft $d$ will bring the end of the arm $f$ into contact with this spring, thus making a temporary electrical current, which is again immediately broken, and this making and breaking of the contact produces a spark, which will ignite the charge of gas within the cylinder and cause it to explode. The spring-arm $g$ is connected with one pole of the battery or device for producing an electric current and the shaft $d$ is connected with the other pole, and the electric circuit is closed momentarily at each revolution of the shaft $d$. One or both electrodes are insulated to insure a current.

As before explained, the engine acts as its own pump during one stroke and the explosion takes place so as to give the piston an impulse at the second stroke. Consequently it is not desirable to produce a spark, except at each alternate revolution. For this reason I have shown a sprocket-wheel $h$, fixed upon the outer end of the shaft $d$, and a chain $i$, passing around this sprocket-wheel, and a sprocket-wheel $j$ upon an intermediate shaft serves to transmit power to rotate the shaft $d$. By the side of the sprocket-wheel $j$ and upon the same sleeve or hub is fixed a sprocket-wheel $k$, and this is driven by a chain $l$ from a sprocket-wheel upon the main shaft or axle. The proportions of these sprockets are such that, as before described, the shaft $d$ will only make one revolution with each two of the main driving-shaft, thus producing its spark only when the cylinder is charged with the explosive gas.

On account of the heat and pressure within the cylinder I have found it difficult to properly lubricate the shaft $d$ where it passes through the stuffing-box $e$. In order to overcome this difficulty, the oil or lubricant is supplied through a pipe or passage $m$, and the connecting-passage $n$ is carried through the side of the cylinder, so as to deliver the lubricant into the bottom or interior end of the stuffing-box chamber. By this arrangement the fresh lubricant is delivered upon the packing at the point nearest the interior of the cylinder, and any pressure or force from the interior will act to force it outward, thus keeping the shaft and its packing thoroughly lubricated and preventing it from becoming dry and burned by the heat within the cylinder. The intermediate sprocket-wheels $j$ and $k$ are mounted upon a sleeve, as shown, this sleeve turning upon a shaft, the inner end of which is adjustable in the plate $o$, fixed to the side of the frame-work or bed of the cylinder. The adjustment may either be made with a crank-arm, as shown at $p$, Fig. 2, or by moving the shaft in a slotted plate either up or down or to right or left, so that the chains will run properly over the sprocket-wheels and have the proper amount of tension. When this is properly constructed, I have found it to be a very suitable and desirable method of operating the electrical mechanism for exploding the gas within the cylinder. The device shown in Fig. 1, with the intermediate sprocket-wheels, is used on engines in which the shaft is so large that a direct connection would necessitate too large a sprocket-wheel at the top. The single chain and direct connection shown in Fig. 2 is applicable to smaller engines. It will be evident that gearing or other well-known means of transmission may be employed for this purpose.

Having thus described my invention, what I claim as new, and desire to secure by Letters Patent, is—

1. In a gas-engine, a cylinder with a piston reciprocating therein and a means for supplying gas or explosive vapor to the interior of the cylinder, with inlet-valve, governor, and exhaust-valve, as shown, in combination with a spring-arm projecting into the cylinder and forming one electrode, a horizontal rotary shaft $d$, extending through the side of the cylinder explosion-chamber to form the other electrode and having its inner end slotted, a radial arm $f$, fitted to the slot, and a set-screw by which the arm is secured and its radial length is regulated with reference to the elastic electrode, substantially as herein described.

2. In a gas-engine, a cylinder and a reciprocating piston, a means for supplying gas or explosive vapor to the interior of the cylinder, with inlet and exhaust valves and regulating mechanisms, a shaft $d$, extending through the side of the cylinder into the explosion-chamber, sprocket-wheels and connecting-chains with tension devices whereby motion is communicated from the engine-shaft to rotate the shaft $d$, a stuffing-box through which said shaft passes, and a pipe or passage $m$, whereby the lubricant is delivered at the bottom or inner end of the stuffing-box chamber, substantially as herein described.

In witness whereof I have hereunto set my hand.

MARCELLUS A. GRAHAM.

Witnesses:
GEO. H. STRONG,
S. H. NOURSE.